Sept. 29, 1931.   L. C. KOOPMANS   1,824,821
ADJUSTABLE BRAKE ROD JAW
Filed May 26, 1928   2 Sheets-Sheet 1
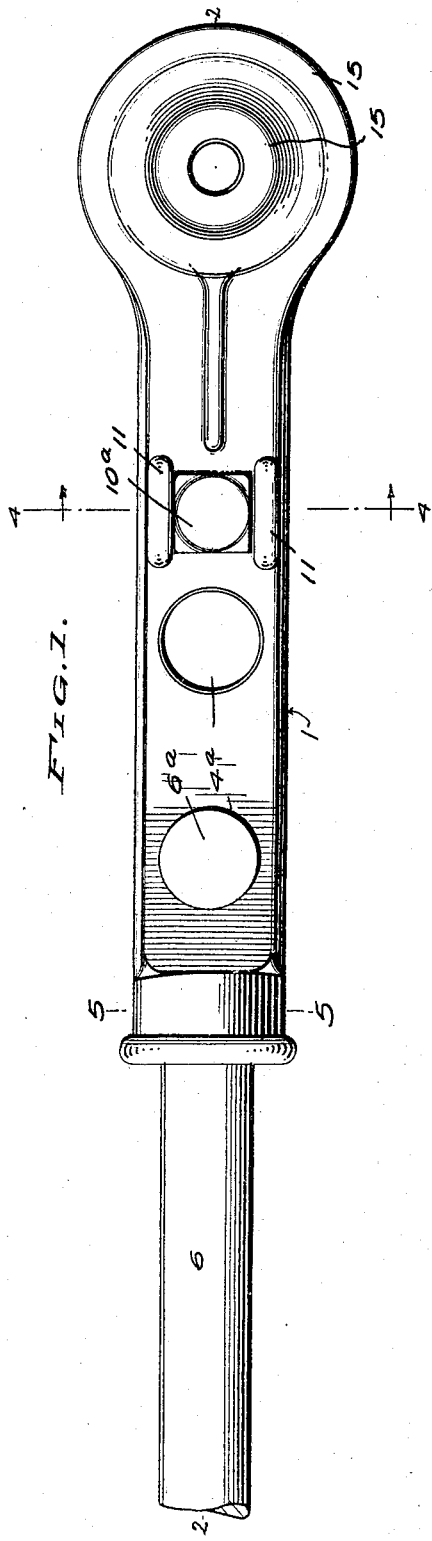
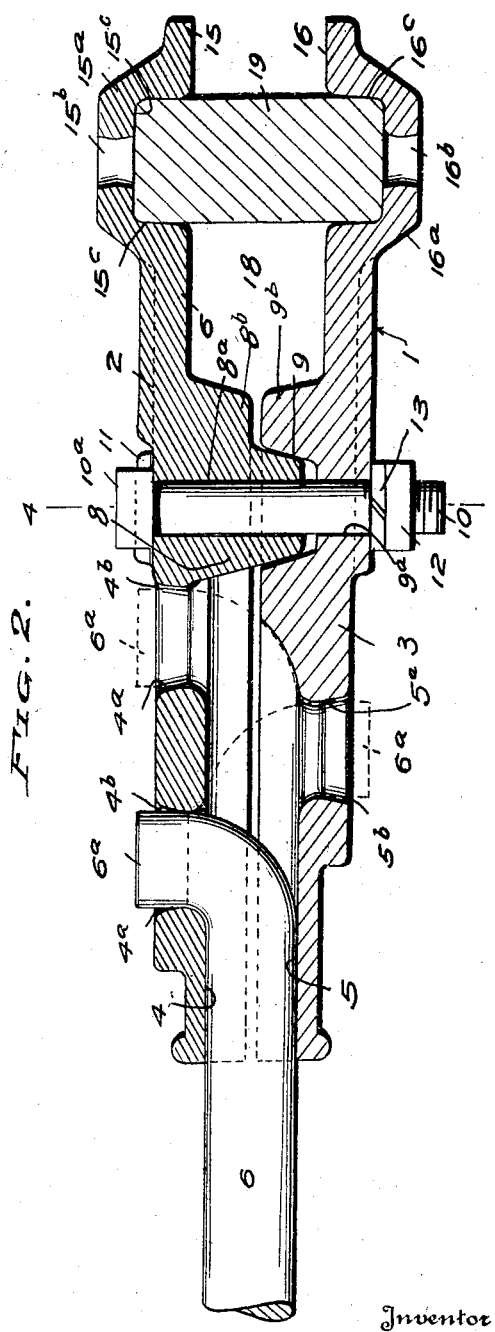
Inventor
LAMBERT C. KOOPMANS
By Eugene E. Stevens
Attorney Sept. 29, 1931.   L. C. KOOPMANS   1,824,821
ADJUSTABLE BRAKE ROD JAW
Filed May 26, 1928   2 Sheets-Sheet 2
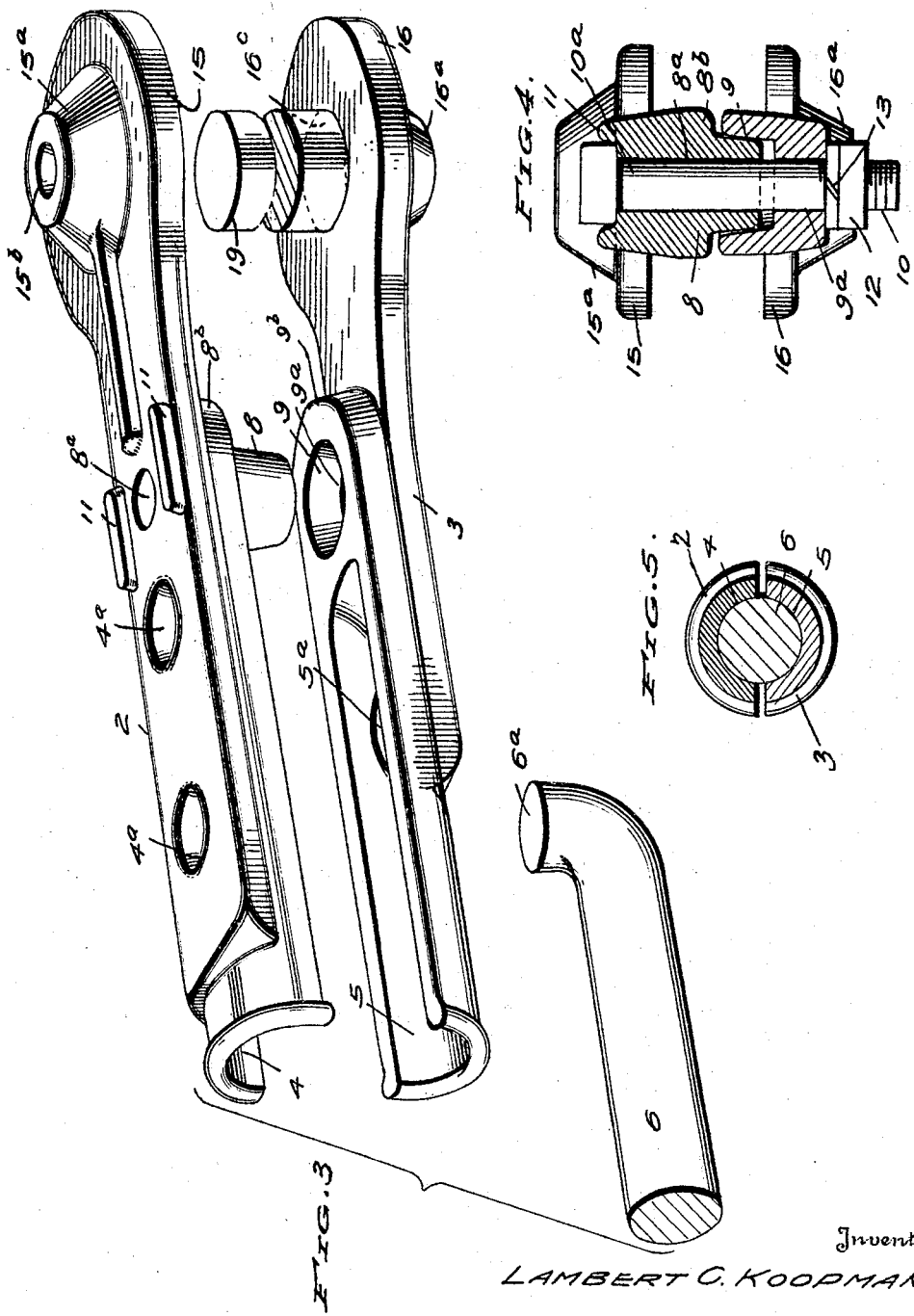

Patented Sept. 29, 1931

1,824,821

UNITED STATES PATENT OFFICE

LAMBERT C. KOOPMANS, OF CHICAGO, ILLINOIS

ADJUSTABLE BRAKE ROD JAW

Application filed May 26, 1928. Serial No. 280,917.

My invention relates broadly to rod and lever connections and more particularly to brake rod jaws,—as they are known in the railway art, and which are employed for connecting the brake rods to the brake beams or levers of railway cars and for establishing connection between other elements of the brake rigging.

Heretofore, the connecting rods used to connect the various levers and other parts of the brake gear have each been composed of a rod of suitable length with a jaw at either or both ends. Such jaw is commonly attached to the lever by means of a pin, forming a pivot joint.

Through constant use and applications of the brake, the friction surface of both the wheel and the brake shoes wear away, causing the movable members of the brake gear to travel farther and farther, as this continual attrition, or wear, occurs, before a retarding or arresting pressure can be applied to the periphery of the wheel. When the limit of extension or contraction of the movable parts of the brake gear has been reached, it is necessary to take the car out of service and lengthen the connecting rods. The car is not only taken out of service for an indefinite period, but skilled blacksmith labor is required to lengthen the connecting rods.

Two types of brake connecting rods are now in general use on American railways. On one type the jaws are component and integral parts of the rod, and on the other the jaws are separate and distinctive parts to which the rod is attached by means of threading the end of the rod through channels or eyes provided in the jaw, and then bending the end of the rod back upon itself, forming a closed hook, or eye. Both of these types of rods employ a removable brake pin to form the pivot joint at the point of attachment to the brake lever.

In practice, with the two common types of brake connecting rods enumerated above, the jaw is straddled over the brake lever and the brake pin is inserted through holes provided in both the lever and the jaw. A cotter key or pin, is then inserted through a hole provided in the end of the brake pin so that the brake pins cannot fall out and allow the brake rod and brake lever to become separated. Sometimes a device known as a "head lock" is used on the head end of the brake pin in the jaw so that the use or employment of the cotter key or pin, is not required.

Through negligence of the car builder, or repairer, head locks or cotter keys are sometimes applied incorrectly and even omitted altogether. This allows the brake pin to work loose and fall out while the car is in transit. The brake is thereby rendered ineffective and parts of the brake gear, allowed to fall and drag, are very frequently the direct cause of serious derailments and consequential loss of life. These are but a few of the deficiencies of the two common types of brake rod jaws now in use.

It is therefore the primary object of this invention to overcome the objections, aforenoted, to prevailing types of brake rod jaws, and to provide a novel and improved device of this character which can be readily applied by unskilled labor, lengthened or adjusted,—all within a few minutes,—without removing the brake rod from the car or taking the car out of service.

A further object of the invention resides in the provision of a device of this kind including a novel enclosed type of brake pin that requires neither a cotter key nor a "head lock",—the relative construction of the pin and associated parts being such that the pin cannot be removed without completely dismantling the jaw, which operation requires the use of tools.

A further object of the invention is to provide a brake rod jaw, as characterized,— which is simple in construction,—involving relatively few parts of an interchangeable character whereby the entire appliance cannot be rendered unusable at one time; one which will be exceedingly durable and efficient in practical use and yet relatively inexpensive of manufacture.

It is also an object of the invention to furnish a device of this kind which can readily be adjusted to compensate for brake shoe wear,—the capacity for adjustment being limited only by the length of the jaw,—and which latter can be made of a length to accommodate any possible combination of adjustment.

The invention also resides in such novel features of construction, combination, and arrangement of the various parts and in modes of operation thereof,—all of which will be readily understood and appreciated by those skilled in the art upon reference to the accompanying drawings in connection with the following detailed description. The now preferred embodiment of the invention has been made the subject of the drawings and description,—but it is to be understood that the invention is susceptible of other mechanical expressions within the scope of the subject matter claimed hereinafter.

In the drawings, wherein the same reference characters have been used to designate the same parts in all views,—

Figure 1 is a top plan view of a brake rod jaw incorporating my invention;

Figure 2 is a longitudinal sectional view taken on the line 2—2 of Figure 1;

Figure 3 is a group perspective view of certain of the parts disassembled;

Figure 4 is a cross section on the line 4—4 of Figures 1 and 2, and

Figure 5 is a cross section on the line 5—5 of Figure 1.

Referring specifically to the drawings, the adjustable jaw member is generally noted at 1 and comprises elongated, preferably drop-forged sections 2, 3. The sections or halves are cored adjacent their rear ends to define chambers 4, 5, respectively, of arcual cross section to receive the end of a brake rod 6.

Figures 2 and 3 clearly illustrate that each of the elongated arcual rod engaging portions 4, 5 is provided with one or more transverse holes $4^a$, $5^a$, respectively,—these being spaced in the direction of the length of the jaw to selectively receive the offset or laterally bent end $6^a$ of the brake rod 6 so as to hold the latter against longitudinal movement relatively of the jaw sections 2, 3.

The body of each of the sections 2, 3 in the region of holes $4^a$, $5^a$ is considerably thickened, as shown, so as to give the jaw increased strength at this point,—and further the surfaces of the holes $4^a$, $5^a$ adjacent the entrances and the exits thereof have walls beveled, as at $4^b$, $5^b$ and are slightly elongated in the direction of the length of the section so as to permit slight rocking movement of the latter relatively to the offset $6^a$ of the rod, as when the parts are being assembled or disassembled, so that these operations will be facilitated.

Figures 2 and 5 illustrate that the fit of the opposed chambers 4, 5 upon the brake rod 6 is such that the opposed edges of sections 2, 3 will be spaced so as to permit the walls of the chambers 4, 5 to firmly grip the rod 6 when the sections are clamped together by the means which will now be described.

The medial portion of section 2 has its inner face provided with a substantially frusto-conical boss 8, which is longitudinally bored, as at $8^a$, and adapted to fit into the frusto-conical recess 9 located at the medial portion of section 3, the latter having a hole $9^a$ adapted to be aligned with hole $8^a$ of boss 8 so as to receive the securing bolt 10.

Bolt 10 preferably has a drive fit in boss bore $8^a$ and a loose fit in the hole $9^a$ of recess 9. It will be evident that the boss 8 has an easy sliding fit in recess 9 to its full depth.

The head $10^a$ of bolt 10 is engaged by opposed cleats 11 formed upon the upper surface of section 2 and arranged on opposite sides of holes $8^a$ whereby the bolt 10 is prevented from turning. The sections 2, 3 are drawn together by the nut 12 threaded on bolt 10 and bearing against a spring washer 13 thereon. Frusto-conical boss portion 8 has a side shoulder $8^b$ in a plane with the edges of chamber 4 and adapted to engage the plane top surface of the thickened portion $9^b$ surrounding the frusto-conical hole 9 of section 3,—which latter surface is on a plane with the edges of the chamber 5 of section 3. Thus, when the edges of the chambered portions 4, 5 are drawn together there will be no tendency of the rear end portions of chambered parts 4, 5 to rock into disengagement from the rod 6. However, as indicated in the drawings, the opposed portions of the jaws 2, 3 are ordinarily spaced and exert a clamping pressure against the pin 19 and rod 6.

The forward jaw ends of sections 2, 3 are provided with circular enlargements 15, 16 the outer surfaces of which are formed with lateral frusto-conical projections $15^a$, $16^a$ having transverse holes $15^b$, $16^b$ communicating with circular chambers $15^c$, $16^c$ in the inner surfaces of portions 15, 16.

The portions of the sections 2, 3, in advance of the boss and socket 8, 9 are offset or spaced from one another when assembled, as shown in Figure 2, to provide the recess 18 for receiving the brake lever, (not shown) and which is provided with a bearing through which the brake pin 19 is adapted to extend. One end of pin 19 is shrunk or sweated into the recess $16^c$ so as to become in effect an integral part of section 3. The other end of pin 19 extends into the circular recess $15^c$ of section 2. It will be manifest that when the two sections 2, 3 are clamped together, pin 19 will be held rigidly in place to secure the end of brake lever in the recess between the forward ends of the two sections 2, 3. By providing the frusto-conical portions 15ª, 16ª with end holes 15ᵇ, 16ᵇ it is possible to drive pin 19 out of engagement with either one of the circular recesses 15ᶜ, 16ᶜ after the sections 2, 3 have been disengaged.

From the foregoing description taken in connection with the accompanying drawings the construction, mode of operation and advantages of my invention will doubtless be readily understood and appreciated by those skilled in the art. There is no danger of pin 19 becoming disengaged and permitting parts of the brake rigging to drag on the road bed to possibly cause derailment of the car in transit. Furthermore it is a very simple matter,—after the brake shoes have become worn to compensate for such wear by adjusting the laterally offset end 6ª of brake rod 6 into a more advanced one of the holes 4ª, 5ª. The only thing that is necessary to be done is to remove bolt 10 and separate sections 2, 3 sufficiently to effect the change.

As will be readily appreciated the use of my invention materially increases the service that may be gotten out of the brake shoes, since it is obvious that the shoes can be kept in use by appropriate adjustment of the rods 6 after they have worn away to such extent that the slack adjusters would otherwise be unable to compensate for such wear. It is also to be noted that when a complete renewal of the brake shoes or wheels is made it is unnecessary to install a new brake rod 6, because a brake rod and jaw construction, as disclosed in my invention, can be adjusted.

Having thus described my invention, what I claim as new and desire to secure by Letters Patent is:

1. A brake rod jaw or the like comprising a pair of separable sections, said sections being formed adjacent one end to embrace a brake rod having a lateral lug and a series of longitudinally spaced holes adapted to selectively receive the lug, means for clamping said sections together, the other ends of said sections spaced from the clamping means defining jaw portions and having opposed recesses, and a coupling pin adapted to be positioned into said recesses and held in place when said sections are clamped together.

2. In a device of the class described comprising separable sections and having means for connection to a brake rod at one end and having jaw portions at the opposite end, said jaw portions having opposed recesses and inner shoulders, a transverse pin non-rotatably secured between said jaw portions and seating in said recesses, said recesses being closed in the direction of the end of said device, and the latter having a single securing and clamping means intermediate the brake rod connection and jaw portions whereby said pin can be seated in said recesses and a gripping engagement upon the brake rod at the other end effected.

3. A device of the class described comprising a pair of separable sections, said sections having means at one end for connection with a brake rod, and also having spaced from said means a frusto-conical boss formed medially of the inner face of one of said sections, the corresponding portion of the other section having a frusto-conical recess to receive said boss, a clamp bolt extending through said boss and recess portions for connecting the sections together, the other ends of said sections being formed to provide spaced jaws for the reception of a brake lever, the inner surfaces of each of said jaws having opposed recesses, and a pin disposed between said jaws and adapted to be received in said recesses for connecting a brake lever between the jaws.

4. A device of the class described comprising a pair of separable sections, a brake rod having a laterally turned end, said sections being cored out transversely on the arc of a circle from one end to a point adjacent the medial portions thereof, whereby to provide means for clamping the brake rod therebetween, the cored out portions of said sections providing a series of holes running in the direction of the length thereof for selective reception of the offset end of said brake rod, a frusto-conical boss portion at the medial part of one of said sections and extending from the inner plate thereof, the other section having a medial frusto-conical socket in its inner face to receive said boss, said frusto-conical boss having a shoulder at one side lying in a plane with the edge of its arcually chambered rod receiving portion, the end wall of said socket lying in a plane with the edge of the arcually chambered rod receiving portion of said second section, a clamp bolt extending through said frusto-conical boss and socket portions to hold said sections assembled, the other ends of said sections being formed to provide spaced jaw portions, the outer surfaces of said jaw portions having lateral enlargements, said lateral enlargements having opposed inner surface recesses, and a transverse pin having its ends adapted to be seated in said recesses whereby to connect a lever between said jaw portions.

5. In a brake rod jaw comprising a pair of separable sections providing an eye-receiving bearing adjacent one end and a rod connecting means adjacent the other end, securing means intermediate the bearing and rod connecting means for holding the sections together, one of the eye bearing defining portions of said sections having fixed therein a lateral pivot stud, and the said eye bearing portion of the other section having a seat for said stud whereby to prevent relative shifting of said sections when assembled.

6. In a brake rod jaw comprising a pair of separable sections providing an eye-receiving bearing adjacent one end and a rod grip adjacent the other end, the rod grip portion of said sections providing a closely spaced lineal series of lug receiving sockets, and a socket of one section being staggered with respect to a socket in the other section, and a single clamp means intermediate said eye bearing and rod grip.

7. A brake rod jaw comprising a pair of separable sections providing an eye receiving bearing adjacent one end and a rod grip adjacent the other end, the rod grip portion of said sections providing a closely spaced lineal series of lug receiving sockets, and a socket of one section being staggered with respect to a socket in the other section and a clamp means for the sections.

8. In a brake rod jaw comprising a pair of separable sections having means for non-rotatably securing an eye-receiving bearing therebetween, adjacent one end thereof, and a rod connecting means adjacent the other end, and securing means intermediate the bearing and rod connecting means for holding the sections together.

In testimony whereof I affix my signature.

LAMBERT C. KOOPMANS.